(12) United States Patent
Roever

(10) Patent No.: US 7,353,310 B2
(45) Date of Patent: Apr. 1, 2008

(54) HIERARCHICAL MEMORY ACCESS VIA PIPELINING WITH DEFERRED ARBITRATION

(75) Inventor: Jens A. Roever, Los Gatos, CA (US)

(73) Assignee: NXP B.V., Eindhoven (NL)

( * ) Notice: Subject to any disclaimer, the term of this patent is extended or adjusted under 35 U.S.C. 154(b) by 192 days.

(21) Appl. No.: 11/165,859

(22) Filed: Jun. 24, 2005

(65) Prior Publication Data

US 2007/0011382 A1 Jan. 11, 2007

Related U.S. Application Data

(63) Continuation-in-part of application No. PCT/IB04/01397, filed on May 6, 2004.

(60) Provisional application No. 60/469,607, filed on May 9, 2003.

(51) Int. Cl.
*G06F 12/00* (2006.01)

(52) U.S. Cl. ............... 710/243; 711/169; 711/140; 712/1

(58) Field of Classification Search ........... 710/110, 710/243, 310
See application file for complete search history.

(56) References Cited

U.S. PATENT DOCUMENTS 5,608,881 A * 3/1997 Masumura et al. ......... 710/310
5,640,527 A * 6/1997 Pecone et al. .............. 711/5
6,772,254 B2 * 8/2004 Hofmann et al. ........... 710/110
7,024,506 B1 * 4/2006 Harrington ................ 710/243
7,046,661 B2 * 5/2006 Oki et al. .................. 370/388
2004/0255088 A1 * 12/2004 Scheuerlein ............... 711/154

* cited by examiner

*Primary Examiner*—Christopher E. Lee
(74) *Attorney, Agent, or Firm*—Peter Zawilski

(57) ABSTRACT

A circuit arrangement and method utilize a hierarchical pipelined memory-access structure incorporating deferred arbitration logic. A multi-stage pipelined network defines at least one pipeline between a plurality of initiators and a shared resource. The multi-stage pipelined network includes first and second stages, where the first stage is disposed intermediate the second stage and the shared resource. First and second arbitration circuits are coupled respectively to the first and second stages of the multi-stage pipelined network, with each arbitration circuit configured to receive requests for access to the resource from at least one initiator and forward such requests to the shared resource. The second arbitration circuit is configured to forward requests to the shared resource via the first arbitration circuit, and the first arbitration circuit is configured to communicate at least one arbitration signal to the second arbitration circuit for use by the second arbitration circuit in arbitrating between requests received thereby. The incorporation of deferred arbitration logic enables arbitration logic to span levels of hierarchy, thus enabling the logical design of the memory-access structure to be effectively decoupled from the physical design.

25 Claims, 6 Drawing Sheets

HIERARCHICAL MEMORY ACCESS VIA PIPELINING WITH DEFERRED ARBITRATION

CROSS-REFERENCE TO RELATED APPLICATIONS

This application is a continuation-in-part of International Application Serial No. PCT/IB2004/001397, filed on May 6, 2004, which claims priority of U.S. Provisional Application Ser. No. 60/469,607, filed on May 9, 2003. The disclosures of these applications are incorporated by reference herein.

FIELD OF THE INVENTION

This invention relates to the field of electronic design, and in particular to a memory access system and method that is particularly well suited for hierarchical design.

BACKGROUND OF THE INVENTION

The use of shared resources among functional processes in a system, such as the use of shared memory within an integrated circuit, generally requires a substantial amount of data-buffering to maintain independence and isolation among the functional processes, and to minimize performance degradation caused by delayed data accesses.

A memory access controller is typically used to arbitrate or regulate access to the memory, wherein each functional process requests access as required, and the memory access controller provides the requested access. If multiple processes request simultaneous access, the memory access controller arbitrates among the requests to resolve the conflict. Furthermore, if certain processes are processing time sensitive data (e.g., video or audio streams), the memory access controller must be capable of ensuring adequate Quality of Service (QoS) for those processes.

To achieve high-speed and performance, care must be taken to assure that a requesting process does not "stall" the system by failing to complete its memory access task in a timely manner. Each process generally contains a buffer that is sufficient to hold the maximum amount of data that it might read from or write to the memory between access intervals. Typically, separate read and write buffers are used within each process to minimize conflicts and delays within the process. To facilitate writing data to the memory efficiently, the process will not request a write access to memory until the data is available to be written, or until it is certain that the data will be available by the time the write access is granted. Similarly, a read operation is not requested until the process is ready to accept the data, or until it can be predicted that it will be ready to accept the data at the time that read data is returned to the requester.

The physical and logical connection of each process's read and write buffers to a memory access controller, or directly to the memory, introduces a number of difficulties in a complex design that may contain dozens of processes that share the same memory. Tristate buses are commonly used to allow multiple devices to access a common resource, but their application is limited in scale, due to capacitive loading effects.

Hierarchical design techniques are employed to minimize the need to directly connect each functional process that shares access to a common resource to that resource. A hierarchical tree-structure is used, with the shared access to the resource, such as a memory, at the highest hierarchical level. Each upper level process has direct access the memory, via a memory access controller; each of the processes at the next lower level in the hierarchy send and receive data to and from the memory via an upper level process; and so on down through the hierarchy.

A hierarchical memory-access structure, however, generally introduces a degradation in performance and an addition in cost. If a lower level process desires to write a block of data to memory, the lower level process must communicate the block of data to the higher level process, so that the higher level process has the data available as soon as it is granted access to write the data to the memory, or access to send the data to the next level of the hierarchy. Thus, the effective data-access time for a lower level process incurs the additional time required to transfer the block of data from the lower level process to buffer at each upper level in the hierarchy. At each level of the hierarchy, a "handshaking" protocol is used to manage the transfer of the data between adjacent levels, further delaying the data-transfer process. This data-transfer process also typically requires that each upper level process contain a buffer that is as large as required by any of its lower level processes, and this buffer may be redundant to an output buffer in the lower level process that could have been used for interfacing with the memory, if this lower level process had been connected directly to the memory in a non-hierarchical manner.

A hierarchical memory-access structure may also present design difficulties from the standpoint of reconciling physical and logical constraints of the various processes coupled to the structure. Particularly in the case of memory-access structures used to connect processes on an integrated circuit chip with shared resources located on the same chip, physical layout issues may dictate a particular physical hierarchy to comply with timing constraints, e.g., by requiring processes that are located in the same physical area of a chip to be coupled to the same node in the memory-access structure to minimize line lengths. However, from the standpoint of logical design, joining unrelated processes at the same node because of timing issues may not be optimal.

As an example, in a system on chip (SOC) design including multiple complex processor cores and numerous secondary processes, it may be optimal to couple a processor core to the same node of a memory-access structure as one or more nearby secondary processes. From a logical design standpoint, however, requiring the node to arbitrate access between a high priority processor core and multiple lower priority secondary processes complicates the arbitration logic and is thus undesirable. Likewise, QoS requirements may be difficult to meet due to a lack of granularity between processes spanning multiple levels of hierarchy.

Addressing these concerns may require custom arbitration logic and/or a reworking of the physical layout of a chip to better conform the physical layout to the desired logical or functional operation of the memory-access structure. As a result, design efforts and costs are often increased, with tradeoffs made to accommodate competing physical and logical design goals.

SUMMARY OF THE INVENTION

The invention addresses these and other problems associated with the prior art by providing a circuit arrangement and method that utilize a hierarchical pipelined memory-access structure incorporating deferred arbitration logic. The incorporation of deferred arbitration logic enables arbitration logic to span levels of the hierarchy, thus enabling the logical design of the memory-access structure to be effectively decoupled from the physical design.

Consistent with one aspect of the invention, therefore, a multi-stage pipelined network defines at least one pipeline between a plurality of initiators and a shared resource. The multi-stage pipelined network includes first and second stages, where the first stage is disposed intermediate the second stage and the shared resource. First and second arbitration circuits are coupled respectively to the first and second stages of the multi-stage pipelined network, with each arbitration circuit configured to receive requests for access to the resource from at least one initiator and forward such requests to the shared resource. The second arbitration circuit is configured to forward requests to the shared resource via the first arbitration circuit, and the first arbitration circuit is configured to communicate at least one arbitration signal to the second arbitration circuit for use by the second arbitration circuit in arbitrating between requests received thereby.

DETAILED DESCRIPTION

The embodiments discussed hereinafter utilize deferred arbitration in a hierarchical resource access system. The principles of the invention are presented herein using the paradigm of a memory that is accessed by multiple processes, although one of ordinary skill in the art will recognize that the principles disclosed herein can be used to provide data transfer to and from any resource with which multiple processes might require access, such as another process. In like manner, the term process is used in the general sense of a controlled sequential operation within one or more devices. For ease of reference and understanding, the invention is presented in the context of access to a single resource, although one of ordinary skill in the art will recognize that the principles presented herein can be readily applied to provide controlled access to multiple resources.

For the purposes of this invention, a pipeline is a coupling of pipeline elements that provide a synchronous delayed coupling to a given resource. Pipelines are directional, for writing and reading data items to and from the resource. In a writing pipeline, a data item in a first pipeline element that is immediately coupled to the resource is clocked into the resource at a first clock cycle. Simultaneously, a data item in a second pipeline element that is immediately coupled to the first pipeline is clocked into the first pipeline element at the first clock cycle, and thus is coupled into the resource at a second clock cycle. Similarly, a data item in a third pipeline element is clocked into the second pipeline element on the first clock cycle, then into the first pipeline element on the second clock cycle, then into the resource on the third clock cycle. A reading pipeline operates similarly, except that the data items are read out of the resource into the first pipeline element on a first clock cycle, then into the second pipeline element on a second clock cycle, and so on.

Figure 1:
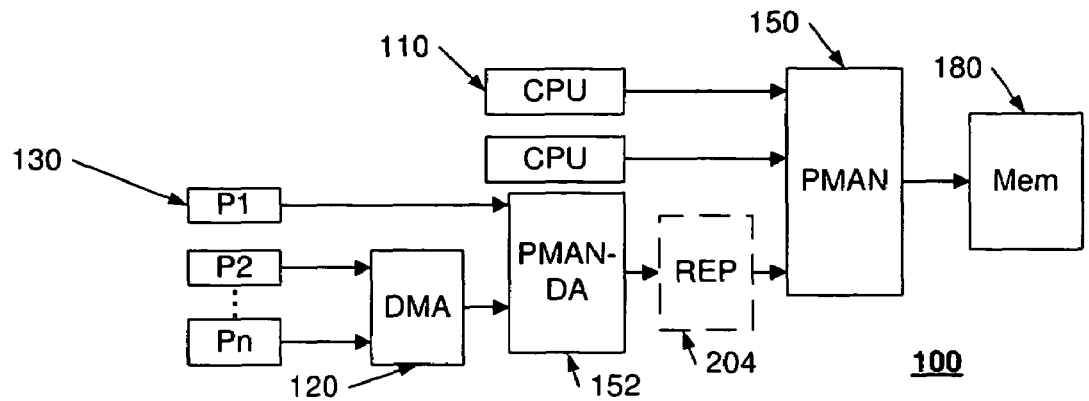
FIG. 1 illustrates an example block diagram of a hierarchical pipelined memory access system in accordance with this invention.

FIG. 1 illustrates an example block diagram of a hierarchical pipelined memory access system 100 in accordance with this invention. In the system 100, a resource/memory 180 is accessed by a plurality of processes 110, 130. The example processes 110 and 130 are organized in a hierarchical structure relative to the memory 180, the processes 110 being at an upper level, or stage, of the hierarchy, and the processes 130 being at a lower level, or stage, of the hierarchy. Typically, devices such as central processing units (CPUs) are located at the upper hierarchy level, and devices such as device controllers and external interfaces are located at lower hierarchy levels. Some of the processors may be coupled to the resource via auxiliary devices, such as a Direct Memory Access (DMA) controller 120.

In accordance with this invention, a Pipelined Memory Access Network (PMAN) controller 150 is used to control access to the memory 180. As detailed below, the controller 150 includes a pipeline coupling with the memory 180, and is configured to dynamically create a routing path between a requesting process 110 and the pipeline to the memory 180 when the requested data transfer is due at the pipeline. That is, if the requesting process 110 requests a write-operation, the requesting process 110 is coupled to the write-pipeline at the time that the first data item that is to be written to the memory is due at the input of the write-pipeline; if the requesting process 110 requests a read-operation, the requesting process 110 is coupled to the read-pipeline at the time that the first data item that is read from the memory arrives at the output of the read-pipeline.

By dynamically rerouting the input to the write-pipeline to each process 110 to feed the pipeline with the data at the process 110, the controller 150 need only provide the elements that form the pipeline, and need not provide additional buffering to store the data from the process 110. In like manner, by rerouting the output of the read-pipeline to the appropriate process 110 when its data is available at the output, the controller 150 need not store the output from the memory for forwarding to the intended processes 110.

In accordance with another aspect of this invention, this same dynamic pipelining concept is used to support a hierarchical access to the memory 180. A Pipelined Memory Access Network-Deferred Arbitration (PMAN-DA) controller 152 couples a plurality of processes 130 to the memory 180 via the controller 150. The controller 152 is configured to dynamically provide a pipeline from the process 130 to a port of the controller 150 so that a continuous pipeline is formed between the process 130 and the resource 180. During a write-operation, the controller 152 provides this dynamic coupling to the process 130 at a time such that the data from the process 130 is available at the end of its write-pipeline-segment at the port of the controller 150 when the controller reroutes the input of its write-pipeline-segment to the port to form a continuous write-pipeline between the process 130 and the resource 180. During a read operation, the controller 152 provides the dynamic coupling at the time that the data from the memory 180 arrives at the end of the read-pipeline-segment of the controller 150. As in the case of the controller 150, the controller 152 need only provide the elements of its pipeline-segments, and need not provide storage for the data that is transferred between the process 130 and the resource 180.

Furthermore, as will be discussed in greater detail below, controller 152 incorporates deferred arbitration, and allows arbitration decisions for its various ports to be made by controller 150. By doing so, logical partitioning of the pipelined memory access network is effectively decoupled from physical partitioning. By utilizing either controller 150 or controller 152 at various nodes in the network, or stages in the pipeline, practically any desired arbitration hierarchy can be implemented with less regard for any constraints placed on the network by the physical layout of the design. Thus, controller 152, disposed at one stage of the network, effectively delegates at least a portion of its arbitration responsibility to controller 150, disposed at a different stage that is intermediate controller 152 and the shared resource (e.g., memory 180). It will be appreciated that a stage may include multiple chained pipeline elements, and moreover, that a controller 152 may rely on a controller 150 separated by more than one stage in some embodiments.

To implement deferred arbitration consistent with the invention, controller 152 forwards information regarding pending requests from one or more initiators to controller 150. In response to such pending requests, controller 150 then passes back one or more arbitration signals to controller 152, which are then used by controller 152 in executing the arbitration decision between such pending requests. Effectively, therefore, controller 150 performs arbitration for both the stage of the network within which controller 150 is disposed, and the stage of the network within which controller 152 is disposed.

Figure 2:
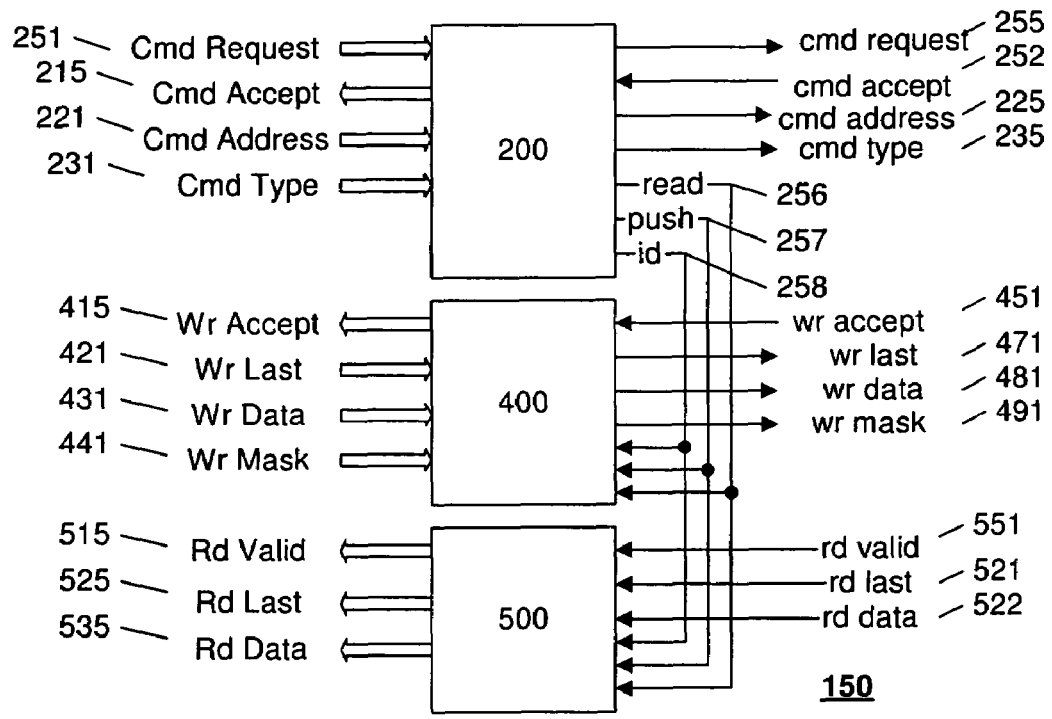
FIG. 2 illustrates an example block diagram of a pipelined memory access controller referenced in FIG. 1.
Figure 3:
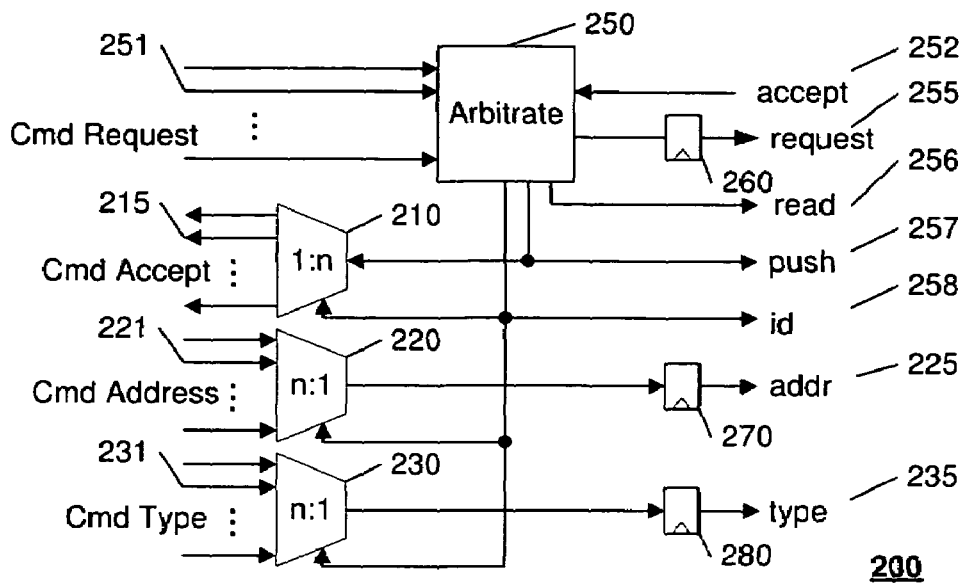
FIG. 3 illustrates an example block diagram of an arbitration module of a pipelined memory access controller referenced in FIG. 2.

As shown in FIG. 2, and as described in the aforementioned cross-referenced application, each controller 150 includes an arbitration module 200, a write-control module 400, and a read-control module 500, as detailed below. FIG. 3 illustrates an example block diagram of an arbitration module 200 of a pipelined memory access controller 150 in accordance with this invention. The arbitration module 200 receives requests for access to the memory 180 (of FIG. 1) from a plurality of processes 110, 130 and/or one or more other PMAN or PMAN-DA controllers, hereinafter termed an initiator. The request is signaled by asserting a command-request signal 251, and providing the command type (read, write, read-modify-write, etc.) 231 and a corresponding address 221 to or from which the data is to be transferred. If multiple initiators assert a command-request signal 251, an arbitrate module 250 determines which of these initiators will be given access, using techniques common in the art, and identifies this initiator via an id signal 258. The id signal 258 controls each of the multiplexers/selectors 210-230 to establish a communications path between the selected initiator and the memory 180.

The memory 180 asserts a command-accept signal 252 whenever it is able to accept a command. The module 200 forwards this command-accept signal 252 to the selected requesting initiator as a "push" signal 257 when the communications path is established, via the 1-of-n selector 210. This signal is output by selector 210 as command-accept signal 215.

The communications path to the memory is established via the pipeline elements 260, 270, 280. These pipeline elements 260-280 are continuously clocked by a system clock (not shown) to load the command-request 251, command-type 231 and command-address 221 into a command-pipeline to the memory, the elements 260, 270, 280 forming the single-delay pipeline to the memory 180. The push signal 257 serves to enable each of the elements 270, 280 when the communications path is established. The pipeline approach of this invention is facilitated by the presumption that the command (i.e. the command-type 231 and command-address 221) is available from the initiator at the time that the initiator asserts the command-request 251. Elements 260, 270 and 280 respectively output their stored values via signals 255, 225 and 235. It will be appreciated that in different embodiments, different command information can be forwarded by a given arbitration module, e.g., additional command identifiers and/or characteristics such as priority/urgency information, initiator identifier information, etc. may also be communicated, either separate from or incorporated into any of the signals forwarded by an arbitration module.

The arbitration module 200 provides the aforementioned push 247 and id 258 signals, as well as a read/write-not signal 256 (also referred to herein as a read/write selection signal), to the write-control 400 and read-control 500 modules to effect the requested and accepted command.

Figure 4:
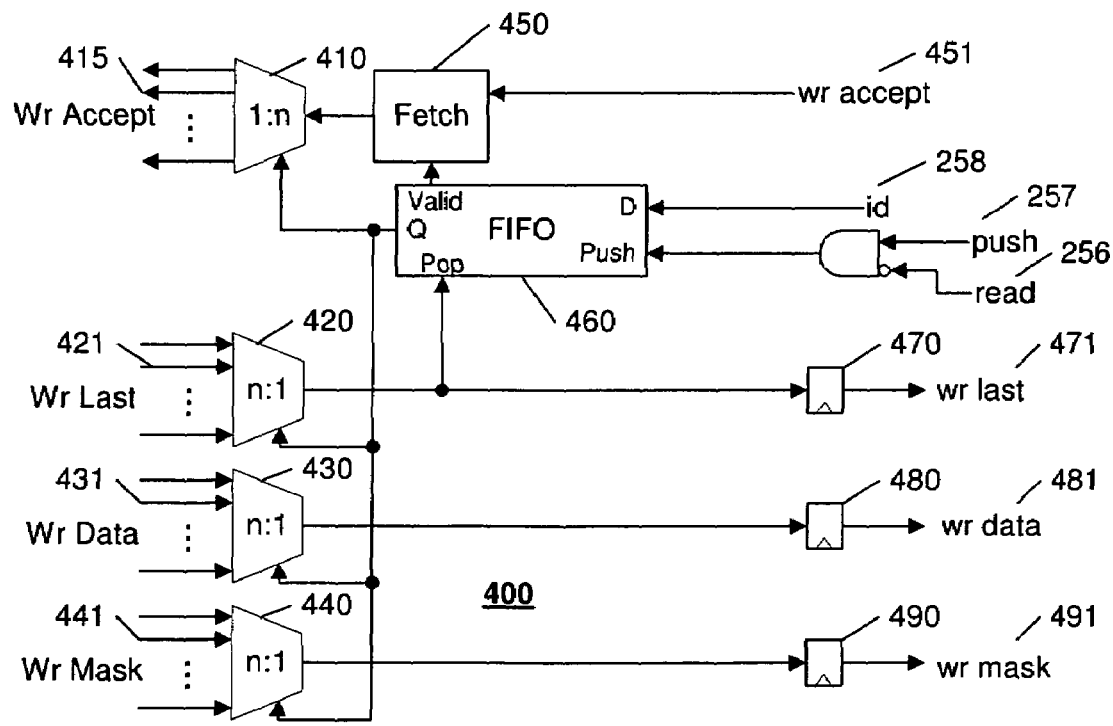
FIG. 4 illustrates an example block diagram of a write-control module of a pipelined memory access controller referenced in FIG. 2.

FIG. 4 illustrates an example block diagram of a write-control module 400 of a pipelined memory access controller 150 in accordance with this invention. Pipeline elements 470, 480, and 490 form a three-input write-pipeline between a select initiator and the memory, the selection being via the multiplexers 420, 430, 440. The three inputs of the write-pipeline in this example embodiment include the data 431 that is to be written, an optional mask 441 to allow selective bit-level writing, and a preferred "last" signal 421 that identifies the end of a block of data that is to be written. The write-last 421 signal facilitates variable length data transfers by signaling the end of each transfer; other methods of supporting variable length data transfers are common in the art and the incorporation of such methods in an alternative embodiment of this invention will be evident to one of ordinary skill in the art in view of this disclosure. Elements 470, 480 and 490 respectively output their stored contents as signals 471, 481 and 491.

The read/write-not signal 256, push 257, and id 258 from the arbitration module 200 are provided to a sequencer-FIFO (first-in first-out buffer) 460 that controls the sequencing of the write operation. The id 258 comprises the data that is contained in the FIFO 460, and the push 257 and read/write-not signal 256 effect the loading (push) of the id 258 into the FIFO 460.

The sequencer-FIFO 460 is configured to couple the initiator identified by the id 258 to the write-pipeline, via the multiplexers 420, 430, 440, so that the data that is to be written to the memory from the identified initiator is at the memory-end of the pipeline when the memory effects the write operation. The aforementioned "last" signal 421 serves to sequence (pop) the next id from the FIFO 460 at the end of each block that is to be written. The FIFO 460 also provides a "valid" signal to the fetch module 450 whenever the FIFO 460 is not empty.

The fetch module 450 enables each of the pipeline elements 470-490 to effect the data transfer from the selected initiator to the pipeline. In a preferred embodiment of this invention, the pipeline elements 470-490 are configured to allow a prefetch of up to two data elements so as to alleviate timing constraints from the initiator to the pipeline.

The write-accept 451 signal is forwarded to the selected initiator via the 1-of-n selector 410, under the control of the fetch module 450 and sequencer 460, to signal the initiation of the write sequence via signal 415. The initiator signals the end of the write sequence via the aforementioned write-last signal 421. In this manner, a continuous sequence of write operations from multiple initiators can be supported by continually redirecting the input to the write-pipeline as required. In a preferred embodiment, the initiator does not provide a conventional "data-ready" signal; the initiator is required to have the data available for loading the pipeline, and cannot stall the memory access by signaling that the data is not-yet-available.

Of particular note, because the write-control module 400 pipelines the input write signals 421, 431, 441 to the outputs 471, 481, 491, multiple write-control modules 400 can be chained together to form a hierarchical network, as illustrated in FIG. 1. That is, in the above description, the initiator could be a lower-level controller 150 or 152; in like manner the memory 180 could be an upper-level controller 150 or 152. At each level of the hierarchy, the sequencer-FIFO 460 assures that the required data is available at the outputs 471, 481, 491 when the upper level module expects it. With regard to performance, each controller 150, 152 introduces a latency defined by the pipeline elements 470, 480, 490. In a preferred embodiment, each controller 150, 152 only introduces a single stage delay, and this delay does not directly affect the performance of the processor 110, 130, because the pipelined architecture assures that whatever data is placed in the pipeline will eventually be written to the memory. That is, the processor need only place the data in the pipeline, and does not need to 'wait' while the data progresses through the pipeline to the memory.

Figure 5:
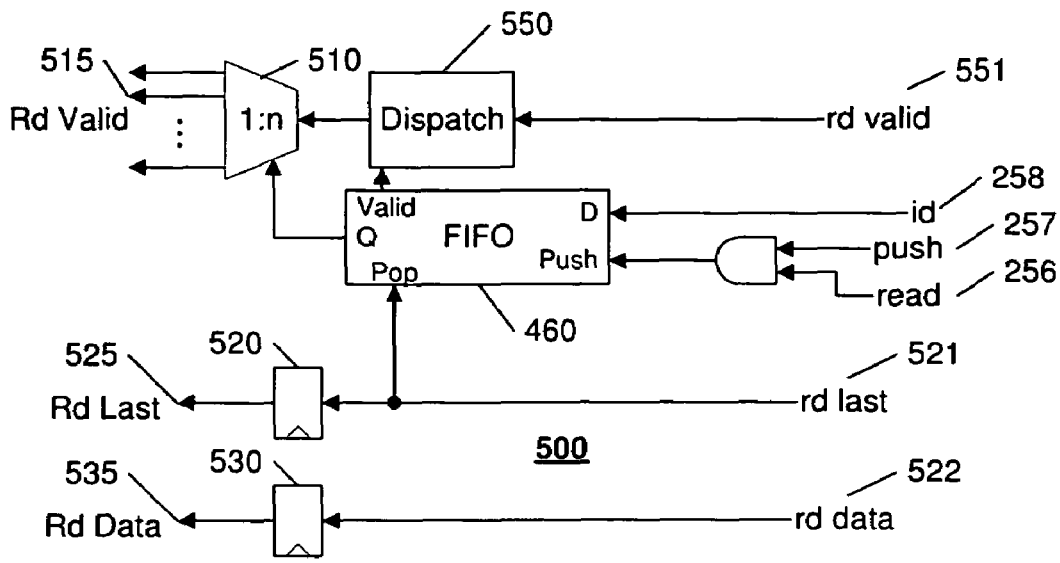
FIG. 5 illustrates an example block diagram of a read-control module of a pipelined memory access controller referenced in FIG. 2.

FIG. 5 illustrates an example block diagram of a read-control module 500 of a pipelined memory access controller 150 in accordance with this invention. Pipeline elements 520, 530 provide a two-output read-pipeline, comprising the data 522 that is read from the memory, and an optional read-last signal 521 that facilitates the read of variable length blocks of data.

In a preferred embodiment of this invention, the data 522 that is read from the memory is provided to all of the initiators via a "broadcast" network structure. In the example embodiment of FIG. 5, a common read-data bus 525 is used. The routing of the data 522 to the appropriate initiator is effected by forwarding a read-valid signal 551 from the memory 180 to the initiator, via a 1-of-n selector 510 that outputs a signal 515. As in the write-control module 400, a sequencer-FIFO 460 controls the routing of the pipeline formed by the pipeline elements 520, 530 so that the appropriate initiator is coupled to the pipeline at the time that the data from the memory 180 is at the initiator-end of the read-pipeline. The sequencer-FIFO 460 also receives the read-last 521 signal that signals the end of each block of read-data, and triggers a redirection of the read-pipeline, via the dispatcher 550.

As with the write-control module 400, the pipelined structure of the read-control module 500 allows multiple read-control modules to be chained together to form a hierarchical network as illustrated in FIG. 1. In a preferred embodiment, each controller 150, 152 introduces a single stage delay, via the pipeline elements 520, 530. To facilitate data distribution and dispatch, the controllers 150, 152 can be configured to attach a process identifier to each read command, and to return this identifier with the read data.

Returning to FIG. 2, the interconnection between modules 200, 400 and 500 in PMAN controller 150 is further illustrated. In particular, signals 256, 257 and 258 generated by module 200 are output to each of modules 400, 500. As such, during an operation, e.g., a write operation, an initiator communicates a command-request 251, command-address 221, and command-type 231 to the arbitration module 200, which forwards this information via signals 255, 225 and 235 to an upper level in the hierarchy, e.g., the memory 180. Upon receipt of a command-accept 252 signal from the memory 180, the arbitration module asserts the push 257 signal, clears the read/write-not 256 signal, and sets the id 258 signal to the selected initiator. These signals 256-258 are forwarded to the write-control module 400 and the read-control module 500, wherein the sequencer (460 in FIG. 4) captures this information and asserts the write-accept 415 signal when the memory indicates that it is ready to accept the data, via the accept 451 signal. In response to the write-accept 415 signal, the initiator provides the sequence of data 431 to be written, and marks the last data element in the sequence via the write-last 421 signal, as discussed above. This information is then output by module 400 via signals 481, 471. Also, as noted above, an optional mask may be provided via signals 441, 491.

Figure 6:
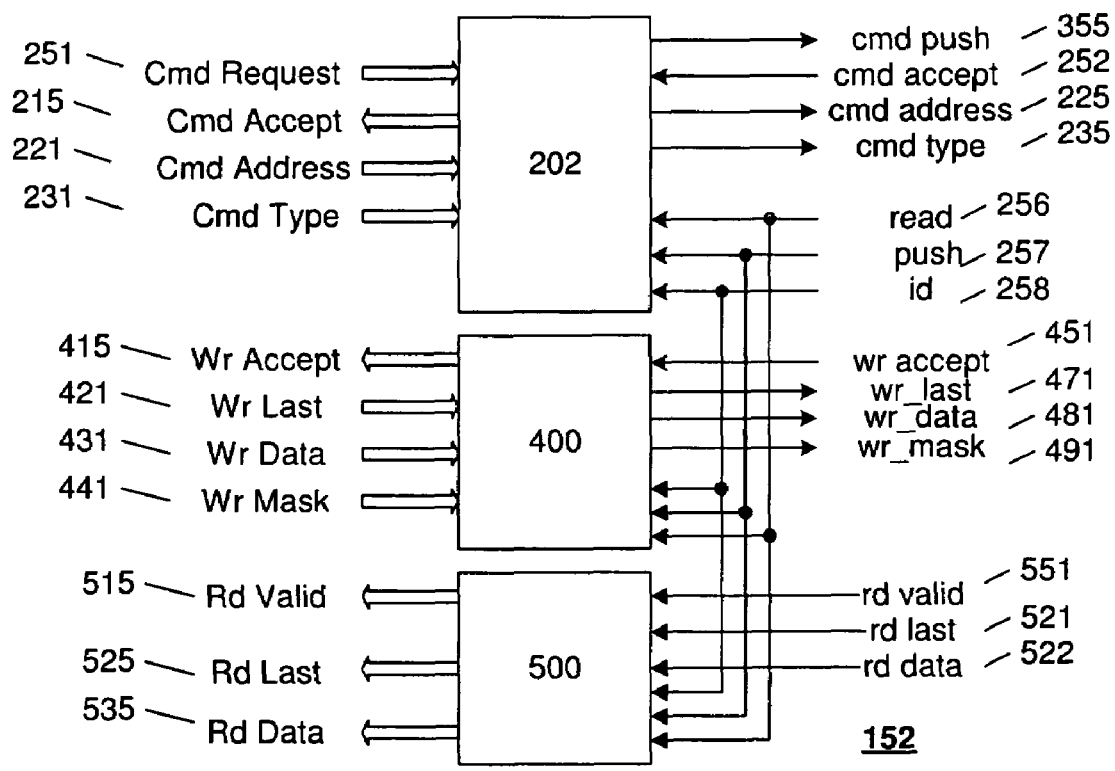
FIG. 6 illustrates an example block diagram of a pipelined memory access controller with deferred arbitration referenced in FIG. 1.

Now turning to FIG. 6, the configuration of a PMAN-DA controller 152 is illustrated in greater detail. Controller 152 typically includes write-control and read-control modules 400, 500 that are configured in a similar manner to those utilized in controller 150. However, controller 152 differs from controller 150 in that a deferred arbitration module 202 is utilized. Module 202 is configured to receive arbitration information, in particular read, push and id signals 256, 257, 258 from another controller, e.g., a higher level controller 150, rather than locally generating such signals. In addition, rather than generating a cmd request signal 255 to an upper level controller 150, module 202 generates a cmd push signal 355, the use and configuration of which will be discussed in greater detail below.

Figure 7:
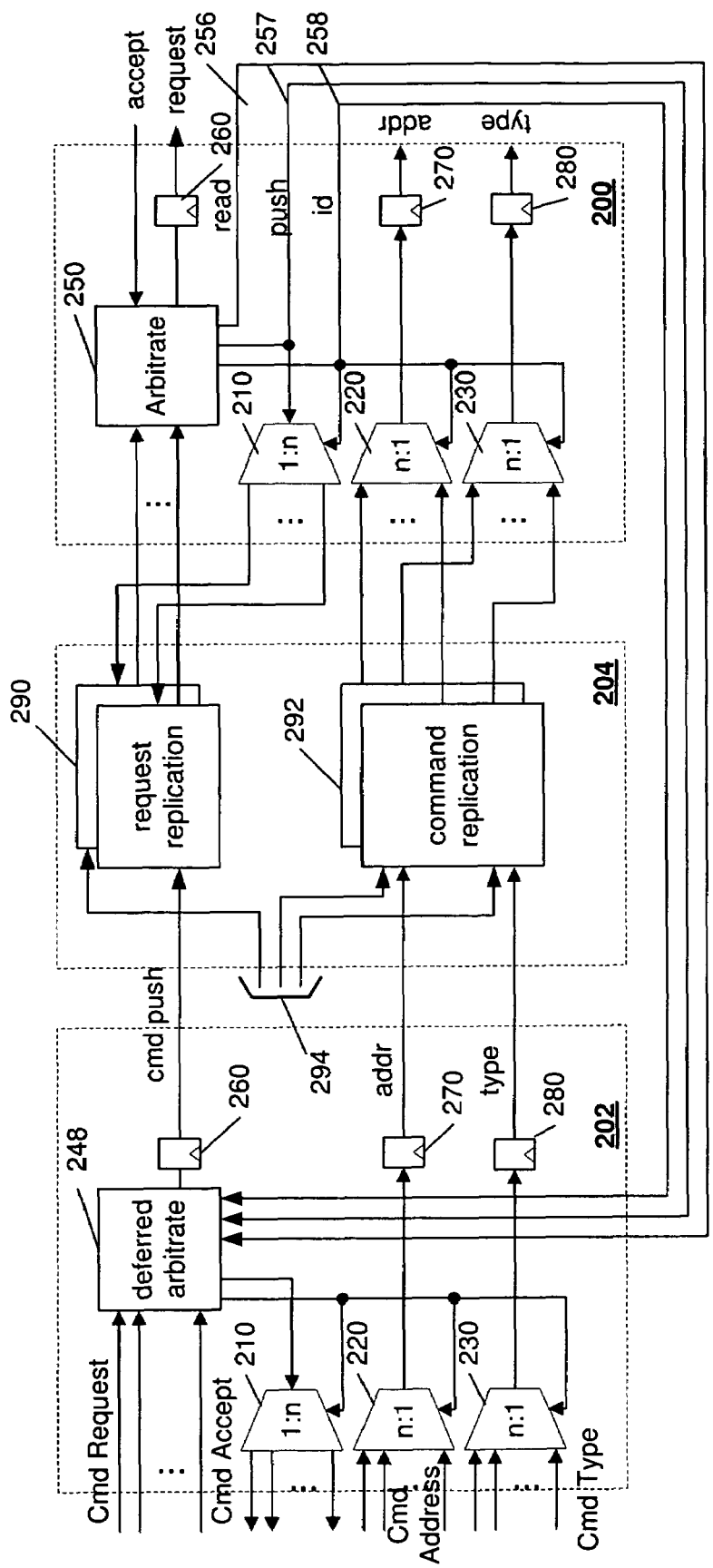
FIG. 7 illustrates an example block diagram of an interconnection between the pipelined memory access controllers referenced in FIG. 1.

The manner in which a PMAN-DA controller 152 may be coupled to a PMAN controller 150 can vary in different embodiments. For example, FIG. 7 illustrates one exemplary interconnection between a deferred arbitration module 202 in a controller 152 and an arbitration module 202 in a controller 150, utilizing an intermediate replication module 204 (also illustrated in FIG. 1). As with arbitration module 200, deferred arbitration module 202 is configured with multiplexers/selectors 210-230 and pipeline elements 260-280. Module 202 differs from module 200, however, in that arbitrate module 250 of module 200 is replaced with a deferred arbitrate module 248 that is configured to receive read, push and id signals 256, 257, 258 generated by the arbitrate module 250 of another controller. In this manner, deferred arbitrate module 248 operates to redistribute signals 256, 257 and 258 to selectors 210-230 and elements 260-280, including performing any decoding of such signals as necessary. An id signal may be implemented in some embodiments as a packed initiator enumeration or a sparse id map consisting of main and sub id's. For example, it may be desirable to encode a multi-level hierarchical identifier in id signal 258 such that only a portion of the id signal is used to select between different initiators coupled to controller 152, with another portion of the id signal used to execute the arbitration decision between controller 152 and any other initiators coupled to controller 150.

In order to couple module 202 to module 200, a replication module 204 is interposed between the two modules. Replication module 204 includes a plurality of request replication blocks 290 and command replication blocks 292. Each request replication block is allocated to a single controller 152, and is used to replicate and buffer the requests issued by the initiators coupled to that controller 152. Likewise, each command replication block 292 is allocated to a single controller 152, and is used to replicate and buffer command address and type signals from each arbitration module 202, such that such information is immediately available to arbitration module 200 when a request is selected by the local arbitrate module 250. Where only one command is buffered at a time, each command replication module 202 may simply consist of a set of pipeline elements that add a single stage to the pipeline.

As noted above deferred arbitrate module 248 of module 202 receives arbitration information from module 200. However, module 248 is still required to arbitrate between concurrent requests for replication from its interconnected initiators. For this reason, module 248 may employ an algorithm such as a round-robin or priority-based algorithm to determine which of multiple concurrently received requests will be forwarded to request replication module 290 of module 204. In the alternative, separate storage and/or pathways may be utilized in module 202 to temporarily buffer concurrently-received requests if so desired, e.g., using hour-glass structures that would allow a limited amount of concurrent accesses.

In the illustrated embodiment, module 248 uses credit-based flow, whereby the module tracks credits for each initiator. The credit for a particular initiator is incremented whenever the initiator is selected and a pending request is pushed to module 204, and is decremented whenever push signal 257 is received with a corresponding id signal 258 that identifies that initiator. The maximum number of credits allowed for a particular initiator is based upon the maximum number of requests that can be buffered for that initiator without causing an overflow. Thus, if there is only storage for a single request by each initiator, each initiator will be held off from issuing additional requests until the current request for that initiator has been processed.

It should be noted that the arbitration module 202 of only one controller 152 is illustrated in FIG. 7; however, if other controllers 152 are used, such additional controllers will have dedicated blocks 290, 292, and will be coupled in a similar manner to module 204, e.g., as illustrated at 294. It will also be appreciated that each request replication block 290 may be configured to replicate any number of requests, and may have dedicated slots for each initiator, or in the alternative, shared slots that are dynamically allocated to initiators.

Replication module 204 may be incorporated into module 200, or may be a separate logic circuit (e.g., as shown in FIG. 1). Moreover, portions of module 204 may be incorporated into each module 202 in some embodiments.

The manner in which arbitrate module 250 of module 200 arbitrates between initiators can vary in different embodiments. For example, round robin or other scheduling algorithms may be used, and furthermore, certain initiators or even certain controllers 152 may be granted higher priority than other initiators/controllers. Unlike embodiments where a controller 150 is responsible for arbitrating only between the requests passed to its inputs, where module 250 is required only to arbitrate between the N requests supplied at inputs 251 (FIG. 3), module 250 in a deferred arbitration scenario is required to additional arbitrate between inputs 251 of one or more lower level controllers 152. As such, the number of initiators in a deferred arbitration scenario will typically be larger than the number of inputs 251 provided in the arbitration module 200 of a controller 150.

It should also be appreciated that while the variable "N" has been used throughout on the various inputs of different modules 200, 202, 400, 500, the modules may have different numbers of inputs to accommodate different numbers of initiators. As such, the value of N for different modules may be different. In addition, some controllers 150, 152 may only support read only or write only capabilities on certain inputs, whereby the number of inputs for each write-control or read-control module 400, 500 may be different within a particular controller instance and/or an entire module 400, 500 may be omitted from a particular controller instance.

To arbitrate between initiators coupled to multiple controllers 152, each request replication module 290 provides a vector of currently-pending requests to arbitrate module 250. In addition, if desired, additional information such as read/write information, priority information, or any other information that may be desirable to utilize in optimizing an arbitration algorithm, may be provided to module 250 to assist in arbitrating between multiple initiators. For example, in environments where it may be desirable to stream together multiple reads or writes, the provision of read/write information for each request may be beneficial in optimizing data flow.

Figure 8:
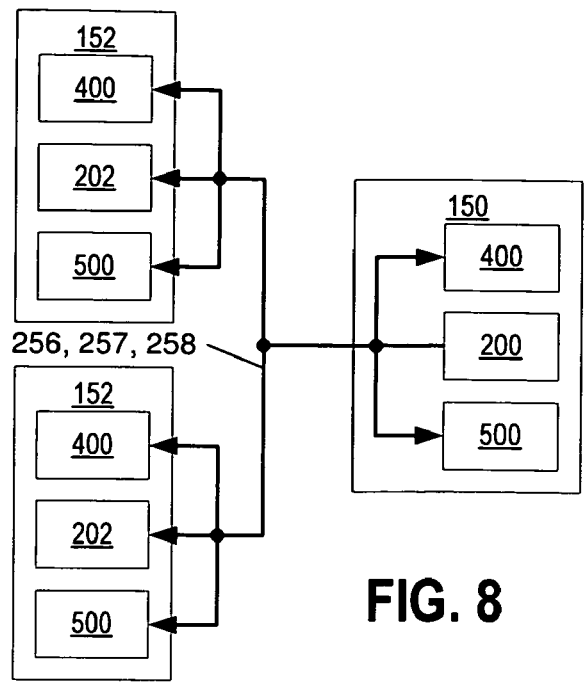
FIG. 8 illustrates an example block diagram of arbitration signals between pipelined memory access controllers referenced in FIG. 1.

Now turning to FIG. 8, the additional interconnection of a controller 150 to multiple controllers 152 is illustrated in greater detail. In particular, FIG. 8 illustrates that the read, push, and id signals 256, 257 and 258 generated by arbitration module 200 of controller 150 are routed to the write and read control modules 400, 500 of controller 150, as well as to the deferred arbitration modules 202, write control modules 400 and read control modules 500 of each controller 152. It is through this interconnection of modules that controller 150 may provide arbitration for each lower level controller 152, while also providing arbitration at its own higher level.

Figure 9:
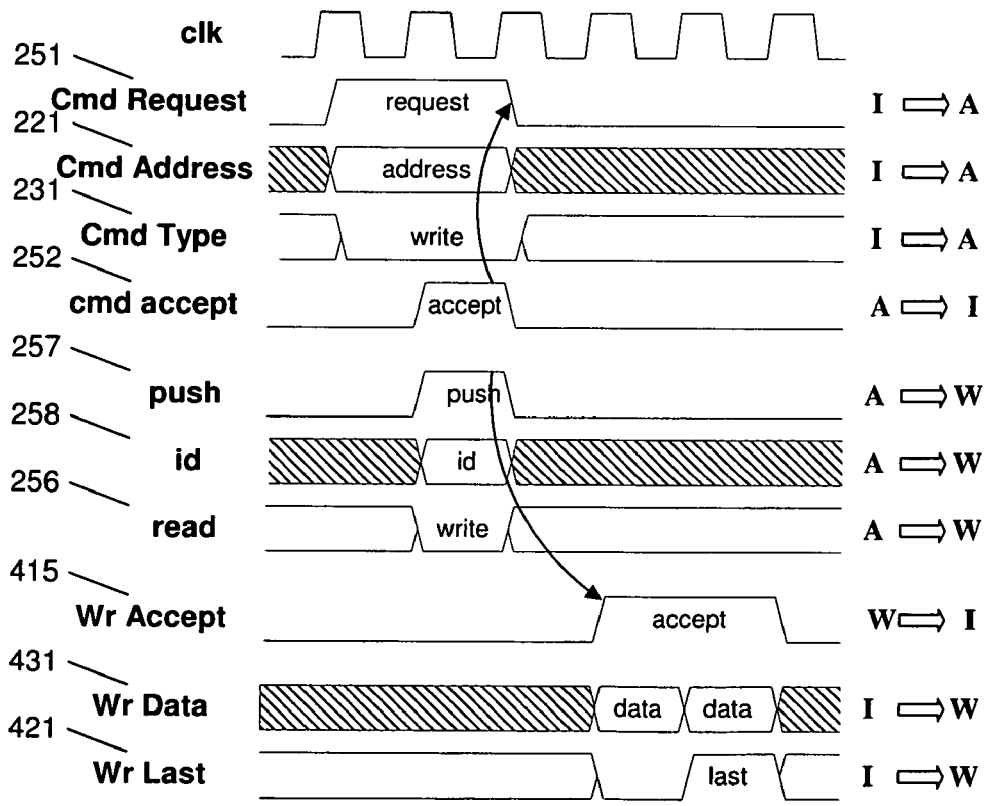
FIG. 9 illustrates an example timing diagram for a pipelined memory access controller in accordance with this invention.

With reference to FIG. 7 and the timing diagram of FIG. 9, an exemplary write operation is illustrated. As shown, a request is received from an initiator at deferred arbitrate module 248 of deferred arbitration module 202. The request is signaled by asserting a command-request signal 251, and providing the command type (read, write, critical word first, etc.) 231 and a corresponding address 221 to or from which the data is to be transferred to module 202. If multiple initiators assert a command-request signal 251, a deferred arbitrate module 248 determines which of these initiators will be given access, and pushes this request in the form of a single strobe cmd push signal to request replication module 290 of replication module 204. The cmd push signal also includes an id signal that identifies which initiator is making the request.

Module 290 replicates the request and forwards the request to local arbitrate module 250 of arbitration module 200, which then generates a push signal 257 and an id signal 258 to control each of the multiplexers/selectors 210-230 in both modules 200 and 202 to establish a communications path between the selected initiator and the memory 180. Push signal 257 is also provided to 1-of-n selector 210 to signal module 204 to fill the appropriate command buffer 250 with the command associated with the selected request.

The memory 180 asserts a command-accept signal 252 whenever it is able to accept a command. The communications path to the memory is established via the pipeline elements 260, 270, 280 in both modules 200, 202 as well as command replication module 292. These pipeline elements 260-280 are continuously clocked by a system clock (not shown) to load the command-request 251, command-type 231 and command-address 221 into a command-pipeline to the memory. The pipelined approach of this invention is facilitated by the presumption that the command (i.e. the command-type 231 and command-address 221) is available from the initiator at the time that the initiator asserts the command-request 251.

The arbitration module 200 provides the aforementioned push 257 and id 258 signals, as well as a read/write-not signal 256, to the write-control 400 and read-control 500 modules of both controllers 150, 152 to effect the requested and accepted command. For a write operation, therefore, the sequencer (460 in FIG. 4) of each module 200, 202, captures signals 256, 257, 258 and asserts the write-accept 415 signal when the upper level stage of the hierarchy (e.g., the memory for controller 150, and write module 400 of controller 150 for controller 152) indicates that it is ready to accept the data, via the accept 451 signal. In response to the write-accept 415 signal, the initiator provides the sequence of data 431 to be written, and marks the last data element in the sequence via the write-last 421 signal, as discussed above. This information is then output by module 400 via signals 481, 471. Also, as noted above, an optional mask may be provided via signals 441, 491.

Various modifications may be made without departing from the spirit and scope of the invention. For example, depending up various timing parameters in a particular environment (e.g., to comply with a particular communications protocol), it may be necessary to add pipeline elements or registers at various points within the architecture to appropriately align the various signals used to process a command. Moreover, it may be desirable in some embodiments to implement multi-stage pipeline elements at various points to perform similar signal alignment.

Figure 10:
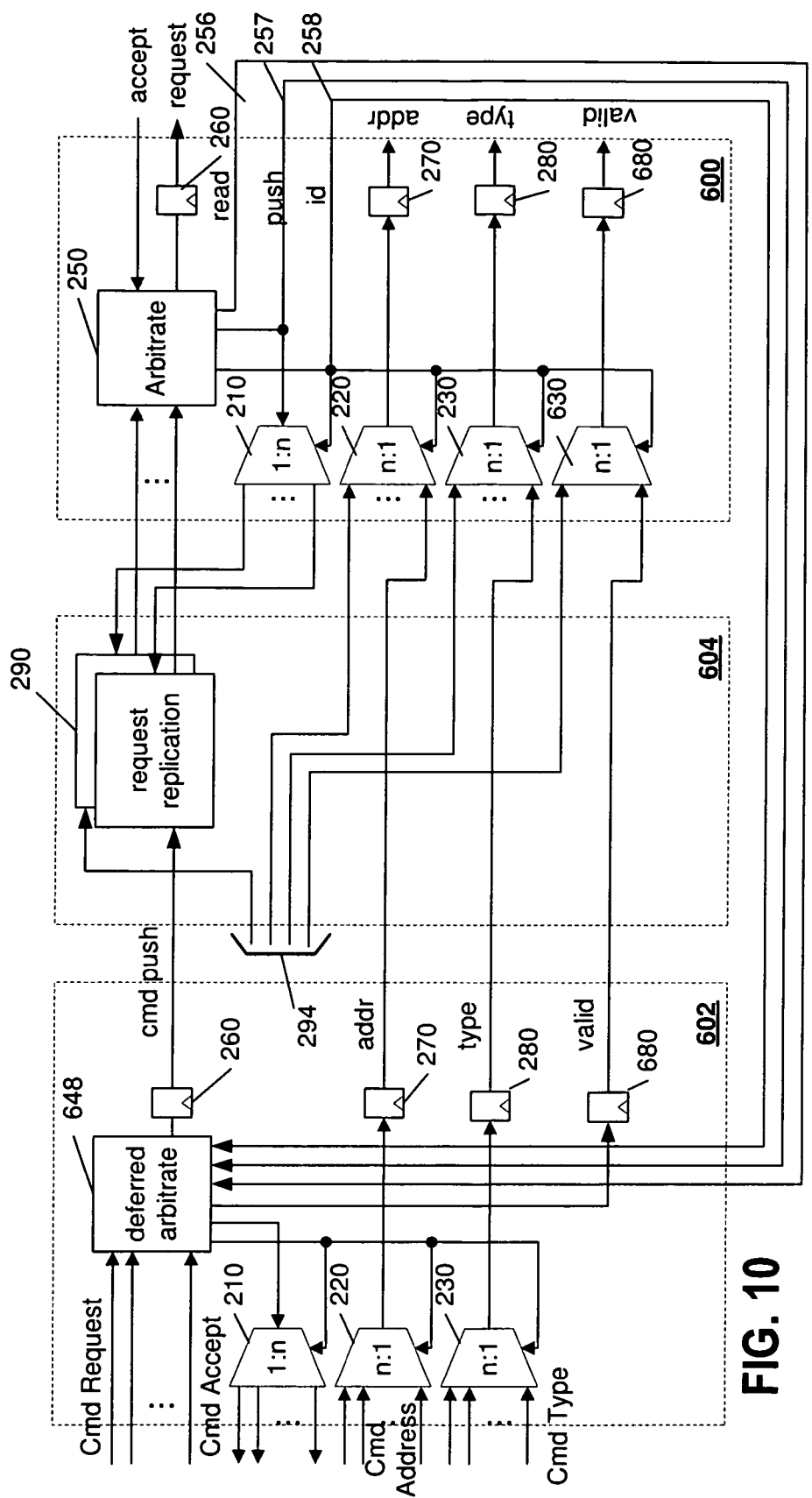
FIG. 10 illustrates an example block diagram of an alternate interconnection between the pipelined memory access controllers referenced in FIG. 1.

As another example, rather than using a demand-driven protocol as described above, it may be desirable to utilize two way handshaking. FIG. 10, for example, illustrates an alternate implementation whereby a higher level arbitration module 600, configured in a similar manner as module 200, is coupled to a lower level deferred arbitration module 602, configured in a similar manner to module 202, via a replication module 604. In this implementation, however, bi-directional handshaking is provided via a valid signal output by deferred arbitrate module 648 and passed to a pipeline element 680. The valid signal is asserted when address and type information for a command is being output by pipeline elements 270, 280 of module 602.

Module 604 differs from module 204 in that no command replication is used. Instead, the address, type and valid signals output by elements 270, 280 of module 602 are passed directly to selectors 220, 230. In addition, module 600 includes an additional selector 630 and pipeline element 680 to forward the valid signal output by pipeline element 680 of module 602 along with the address and type information passed up through the hierarchy. In still another alternative embodiment, two way handshaking may also be implemented in the read and/or write data paths, if desired.

The foregoing merely illustrates the principles of the invention. It will thus be appreciated that those skilled in the art will be able to devise various arrangements which, although not explicitly described or shown herein, embody the principles of the invention and are thus within its spirit and scope. In addition, it will be appreciated that the implementation of the various functions described herein in suitable logic designs would be well within the abilities of one of ordinary skill the art having the benefit of the instant disclosure. These and other system configuration and optimization features will be evident to one of ordinary skill in the art in view of this disclosure, and are included within the scope of the following claims.

What is claimed is:

1. A circuit arrangement, comprising:
   a multi-stage pipelined network defining a read pipeline and a write pipeline between a plurality of initiators and a memory, the multi-stage pipelined network including first and second stages, wherein the first stage is disposed intermediate the second stage and the memory;
   a first access controller coupled to the first stage of the multi-stage pipelined network, the first access controller including a first arbitration circuit, a first read control circuit disposed in the read pipeline and a first write control circuit disposed in the write pipeline;
   a second access controller coupled to the second stage of the multi-stage pipelined network, the second access controller including a second arbitration circuit, a second read control circuit disposed in the read pipeline and a second write control circuit disposed in the write pipeline;
   wherein the second arbitration circuit is configured to receive a first request for access to the memory from a first initiator coupled thereto and forward the first request to the first arbitration circuit, wherein the first arbitration circuit is configured to generate an identification signal that identifies the first initiator, a push signal that initiates processing of the first request, and a read/write selection signal that selectively activates one of the read and write pipelines, the first arbitration circuit further configured to output the identification, push and read/write selection signals to the second arbitration circuit, the first and second read control circuits and the first and second write control circuits to initiate processing of the first request to communicate data between the first initiator and the memory over one of the read and write pipelines.

2. A circuit arrangement, comprising:
   a multi-stage pipelined network defining at least one pipeline between a plurality of initiators and a shared resource, the multi-stage pipelined network including first and second stages, wherein the first stage is disposed intermediate the second stage and the shared resource;
   first and second arbitration circuits coupled respectively to the first and second stages of the multi-stage pipelined network, wherein each arbitration circuit is configured to receive requests for access to the resource from at least one initiator and forward such requests to the shared resource, wherein the second arbitration circuit is configured to forward requests to the shared resource via the first arbitration circuit, and wherein the first arbitration circuit is configured to communicate at least one arbitration signal to the second arbitration circuit for use by the second arbitration circuit in arbitrating between requests received thereby.

3. The circuit arrangement of claim 2, further comprising first and second control circuits respectively coupled to the first and second stages of the multi-stage pipelined network, the first and second control circuits respectively responsive to the first and second arbitration circuits to route data associated with a selected request between the shared resource and the initiator associated with the selected request.

4. The circuit arrangement of claim 2, wherein the shared resource is a memory.

5. The circuit arrangement of claim 2, wherein the at least one pipeline includes at least one write pipeline that communicates data from a first selected initiator to the shared resource, and at least one read pipeline that communicates data from the shared resource to a second selected initiator.

6. The circuit arrangement of claim 2, wherein the at least one initiator includes a third arbitration circuit disposed at a third stage of the multi-stage pipelined network, wherein the second stage is disposed intermediate the first and third stages.

7. The circuit arrangement of claim 2, wherein the pipeline includes at least one pipeline element in each of the first and second stages, the at least one pipeline element in each stage configured to provide not more than one cycle of delay between a selected initiator and the shared resource when the selected initiator is coupled to the at least one pipeline.

8. The circuit arrangement of claim 2, wherein the at least one arbitration signal includes an identifier signal that identifies a selected initiator, and wherein the second arbitration circuit is configured to control a multiplexer coupled to the pipeline responsive to the identifier signal to couple the selected initiator to the pipeline.

9. The circuit arrangement of claim 2, wherein the at least one arbitration signal includes a push signal configured to initiate processing of a request from a selected initiator by the second arbitration circuit.

10. The circuit arrangement of claim 2, wherein the at least one pipeline includes a read pipeline and a write pipeline, and wherein the at least one arbitration signal includes a read/write selection signal configured to selectively activate one of a read control circuit and a write control circuit respectively coupled to the read and write pipelines in the second stage of the network.

11. The circuit arrangement of claim 2, wherein the at least one arbitration signal includes an identifier signal, a push signal and a read signal.

12. The circuit arrangement of claim 2, further comprising a replication circuit disposed intermediate the first and second arbitration circuits and configured to replicate at least one request forwarded by the second arbitration circuit to the first arbitration circuit.

13. The circuit arrangement of claim 12, wherein the replication circuit is further configured to replicate command data associated with the at least one request forwarded by the second arbitration circuit to the first arbitration circuit.

14. An integrated circuit device comprising the circuit arrangement of claim 2.

15. The integrated circuit device of claim 14, further comprising the plurality of initiators and the shared resource.

16. A method of transferring data between a plurality of initiators and a resource that is shared by the plurality of processes, comprising:
receiving in a multi-stage pipelined network coupled intermediate the plurality of initiators and the resource a first request for access to the resource from a first initiator among the plurality of initiators, wherein the multi-stage pipelined network defines at least one pipeline between the plurality of initiators and the resource, and wherein the multi-stage pipelined network includes first and second stages, with the first stage disposed intermediate the second stage and the resource;
forwarding the first request to a first access controller coupled to the first stage of the multi-stage pipelined network using a second access controller coupled to the second stage of the multi-stage pipelined network;
performing arbitration for the first and second stages of the multi-stage pipelined network using the first access controller, including selecting the first request for access to the resource and communicating at least one arbitration signal from the first access controller to the second access controllerl for use by the second access controller in initiating processing of the first request over the multi-stage pipelined network.

17. The method of claim 16, wherein the resource is a memory.

18. The method of claim 16, wherein the at least one pipeline includes at least one write pipeline and at least one read pipeline.

19. The method of claim 16, wherein the pipeline includes at least one pipeline element in each of the first and second stages, the at least one pipeline element in each stage configured to provide not more than one cycle of delay between the first initiator and the resource when the first initiator is coupled to the at least one pipeline.

20. The method of claim 16, wherein the at least one arbitration signal includes an identifier signal that identifies the first initiator, and wherein the second access controller is configured to control a multiplexer coupled to the pipeline responsive to the identifier signal to couple the first initiator to the pipeline.

21. The method of claim 16, wherein the at least one arbitration signal includes a push signal configured to initiate processing of the first request from the first initiator by the second access controller.

22. The method of claim 16, wherein the at least one pipeline includes a read pipeline and a write pipeline, and wherein the at least one arbitration signal includes a read/write selection signal configured to selectively activate one of a read control circuit and a write control circuit respectively coupled to the read and write pipelines in the second stage of the network.

23. The method of claim 16, wherein the at least one arbitration signal includes an identifier signal, a push signal and a read signal.

24. The method of claim 16, further comprising replicating at least one request forwarded by the second access controller to the first access controller.

25. The method of claim 24, wherein replicating the at least one request includes replicating command data associated with the at least one request.

* * * * *